United States Patent
Shukla et al.

(10) Patent No.: US 7,217,445 B2
(45) Date of Patent: May 15, 2007

(54) ALIGNED LIQUID CRYSTAL LAYER CONTAINING LEWIS ACIDS AND PROCESS FOR INCREASING THE TILT

(75) Inventors: Deepak Shukla, Webster, NY (US);
Thomas R. Welter, Webster, NY (US);
James F. Elman, Fairport, NY (US);
Samir Y. Farid, Rochester, NY (US)

(73) Assignee: Nitto Denko Corporation, Ibaraki-shi (JP)

( * ) Notice: Subject to any disclaimer, the term of this patent is extended or adjusted under 35 U.S.C. 154(b) by 480 days.

(21) Appl. No.: 10/736,134

(22) Filed: Dec. 15, 2003

(65) Prior Publication Data
US 2005/0129873 A1    Jun. 16, 2005

(51) Int. Cl.
*C09K 19/54* (2006.01)
*C09K 19/52* (2006.01)
*G02F 1/133* (2006.01)

(52) U.S. Cl. ................ 428/1.3; 252/299.01; 252/299.5

(58) Field of Classification Search ........... 252/299.01, 252/299.5; 428/1.1, 1.3
See application file for complete search history.

(56) References Cited

U.S. PATENT DOCUMENTS

| | | | |
|---|---|---|---|
| 3,848,966 A | 11/1974 | Smith et al. | |
| 3,894,793 A | 7/1975 | Haas | |
| 3,979,319 A | 9/1976 | Fukai et al. | |
| 6,737,127 B2 * | 5/2004 | Tsuboyama et al. | ......... 428/1.4 |
| 2002/0180925 A1 | 12/2002 | Tsuboyama et al. | |

FOREIGN PATENT DOCUMENTS

| | | |
|---|---|---|
| GB | 1 376 115 | 12/1974 |
| GB | 1 455 442 | 11/1976 |
| JP | 2002-037777 | 2/2002 |
| JP | 2002-038158 | 2/2002 |
| JP | 2002-062531 | 2/2002 |
| JP | 2002-062533 | 2/2002 |

OTHER PUBLICATIONS

D. Shukla et al, "An Aligned Liquid Crystal Layer Containing Onium Salts and Process for Increasing the Tilt", U.S. Appl. No. 10/736,342, (D-84415) filed Dec. 15, 2003, US 20050129875.

D. Shukla et al., "An Aligned Liquid Crystal Layer Containing Azolium Salts and Process for Increasing the Tilt", U.S. App. No. 10/736,392, (D-84398) filed Dec. 15, 2003, US 20050129874.

* cited by examiner

*Primary Examiner*—Shean C. Wu
(74) *Attorney, Agent, or Firm*—Westerman, Hattori, Daniels & Adrian, LLP.

(57) ABSTRACT

Disclosed is a multilayer film comprising a substrate bearing an aligned liquid crystal layer wherein the liquid crystal layer contains a Lewis acid. Such a film is useful for aligning a liquid crystal material to an increased tilt angle.

28 Claims, 1 Drawing Sheet

ALIGNED LIQUID CRYSTAL LAYER CONTAINING LEWIS ACIDS AND PROCESS FOR INCREASING THE TILT

FIELD OF THE INVENTION

This invention relates to a method for controlled increase of tilt angle of liquid crystal molecules by Lewis acid(s) and to an aligned layer of liquid crystal molecules on a substrate having an orientation layer and a liquid crystal layer containing Lewis acid effective to increase the tilt angle of liquid crystal molecules.

BACKGROUND OF THE INVENTION

The vast majority of liquid crystal displays (LCD) require uniform liquid crystal (LC) molecular orientation, usually with a small angle between the LC director n and substrate; this angle is called the "pretilt" angle. A number of methods have been used to achieve tilted alignment of LCs. These are described in detail in *Fundamentals and Applications of Liquid Crystals* published by Industrial Survey Association (1991). The most common technique to achieve oblique alignment involves deposition of a thin polymer layer on the substrate, which is subsequently rubbed. Rubbing of the polymer determines the azimuthal orientation of the LC molecular alignment, and induces a non-zero pretilt angle. Polyimide (PI) films are commonly used for rubbing alignment of LC's because of their outstanding thermal stability, low dielectric constant, excellent chemical resistance and high productivity. Furthermore, LC alignment on rubbed PI film generally provides a stable pretilt angle preventing reverse tilt disclination of LC molecules with applied voltage. However, the pretilt angle depends on the properties of the orientation film itself. Thus to satisfy specific pretilt angle requirements for various LCD modes, specific polyimides have been made for controlling the pretilt angle. For example, polyimides with long alkyl and fluorinated alkyl side groups have been used to generate high LC pretilt angles. It has been suggested that steric interaction between LC molecules and branched long alkyl side chains is a possible cause for high pretilt angles.

The rubbing method suffers from several drawbacks, however, especially accumulation of static charges at the thin film transistor sites and generation of dust particles. Recently, new non-rubbing alignment techniques, based on photo-induced anisotropy of the polymerizable orienting layers, have been introduced. Typically the photosensitive polymer films are illuminated by polarized ultraviolet light, and the azimuthal orientation of the resulting planar alignment depends on the specifics of the photo-induced reaction. In contrast to the rubbing technique, neither excess charge nor dust is created on the substrates, yet control is maintained over both the tilt angle and the anchoring strength. The traditional rubbing technique establishes a unique direction of the tilted easy axis; this direction is determined by the direction of rubbing. On the other hand, for photoalignment there is a twofold degeneracy of the light-induced easy axis. This twofold degeneracy causes poor reproducibility of the pretilt angle and, more importantly, the appearance of defects at the resulting boundaries between orientation domains. This degeneracy may be partially removed during the filling of the LC cell because of the effect of flow alignment, but the resulting alignment is not temporally stable. To date, the most promising method to break this degeneracy involves oblique irradiation of the photoalignment layer. Oblique polarized irradiation makes an angle with the surface and the photoreaction for on-axis transition moments is much easier than that of off-axis ones. Consequently the tilt degeneracy is broken and the liquid crystals tilt in a preferred direction. Such an irradiation scheme requires specialized equipment and have proven difficult to implement in a large scale process.

Other non-contact for aligning LC molecules include a stretched polymer, a Langmuir Blodgett film, a grating structure produced by microlithography, oblique angle deposition of silicon oxide, and ion beam irradiation of a polyimide surface as in U.S. Pat. No. 5,770,826. The method places the LC's on a polyimide surface which has been bombarded with low energy (about 100 eV) $Ar^+$ ions. This method has been extended to include diamond-like carbon (DLC), amorphous hydrogenated silicon, SiC, $SiO_2$, glass, $Si_3N_4$, $Al_2O_3$, $CeO_2$, $SnO_2$, and $ZnTiO_2$ films as described in U.S. Pat. No. 6,020,946.

JP 2002038158 discloses a method for the formation of a liquid crystal layer containing liquid crystal molecules on a substrate and the orientation of the liquid crystal molecules. A pyridinium quaternary salt is added to the liquid crystal layer or a layer adjacent to it, and the inclination angle of the liquid crystal molecules is controlled by the action of the pyridinium quaternary salt. Although this invention provides an advantage in controlling the tilt angle of liquid crystal over other existing methods, it only provides a limited class of molecules that are capable of increasing the tilt; thus, further new materials for inducing LC pretilt are needed.

In all the methods of LC alignment described above, control of LC pretilt angle requires the use of a specific combination of the LC molecules and the alignment polymer or specific materials. Developing and optimizing such combination (of alignment polymers and LC's) is a difficult and time-consuming process. There is a need for alternative ways to control the pretilt angle of liquid crystal to the desired angle and in an easy manner.

SUMMARY OF THE INVENTION

The invention provides a multilayer film comprising a substrate bearing an aligned liquid crystal layer wherein the liquid crystal layer contains a Lewis acid. Also disclosed is an optical component and a liquid crystal display comprising the multilayer and a process for making the multilayer.

Such a film is useful for aligning a liquid crystal material to an increased tilt angle.

DETAILED DESCRIPTION OF THE INVENTION

Figure 1:
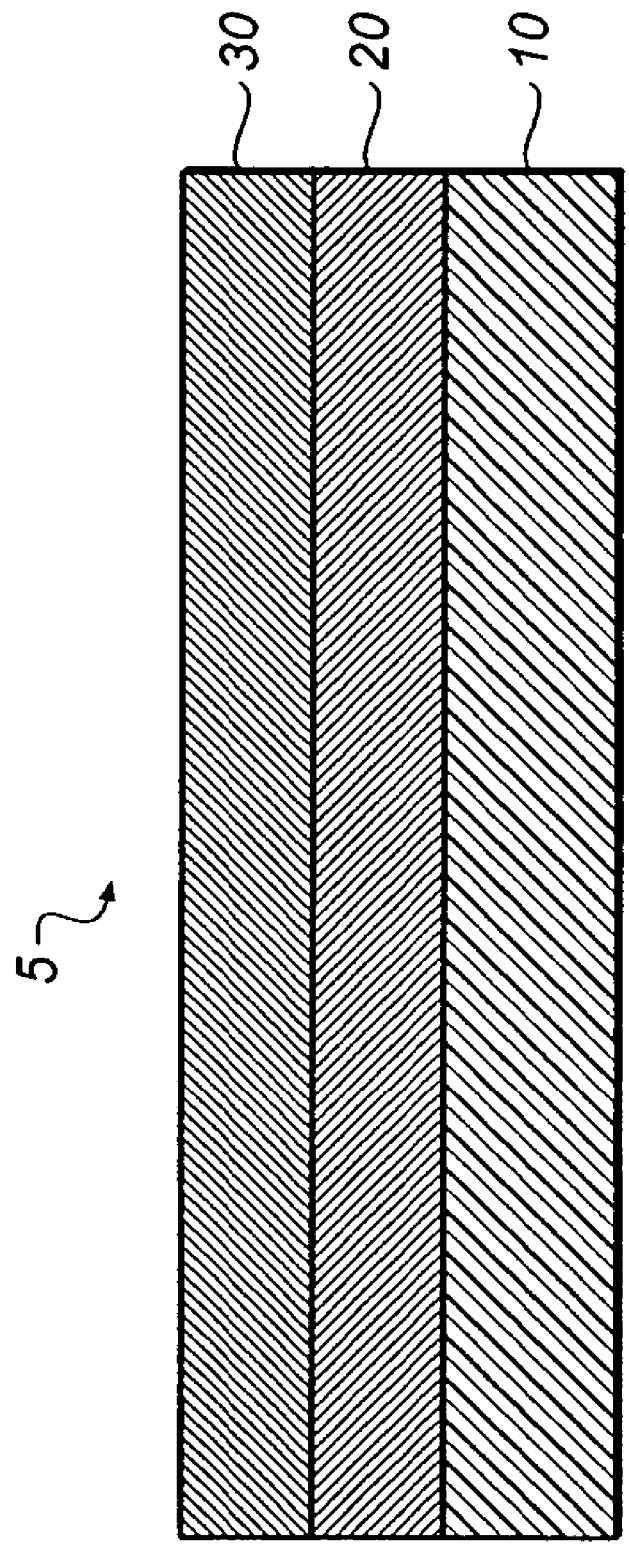
FIG. 1 is a cross-sectional schematic of a multilayer of the invention.

All reference to the Periodic Table of the Elements herein shall refer to the Periodic Table of the Elements, published and copyrighted by CRC Press, Inc., 1995. Also, any reference to a Group or Groups shall be to the Group or Groups as reflected in this Periodic Table of the Elements using the IUPAC system for numbering groups.

As used herein, a Lewis acid is defined as any species that is capable of accepting an electron-pair. This definition includes those chemical species that are proton sources (Brønsted and Arrhenius acids) as well as those that are aprotic such as $BF_3$.

The present invention provides a method for controlled tilt increase of oriented liquid crystal molecules by added Lewis acids as summarized above. The current invention is described by referring to FIG. 1 which shows a cross-sectional schematic view of an oriented liquid crystal multilayer film 5. This structure comprises a substrate 10 of transparent material, such as glass or polymer. It should be understood that to be called as a substrate, a layer must be solid and mechanically strong so that it can stand alone and support other layers. A typical substrate is made of triacetate cellulose (TAC), polyester, polycarbonate, polysulfone, polyethersulfone, or other transparent polymers, and has a thickness of 25 to 500 micrometers. Substrate 10 typically has low in-plane retardation, preferably less than 10 nm, and more preferably less than 5 nm. In some other cases, the substrate 10 may have larger in-plane retardation (some short discussion of the relevance of retardation might be useful here or in the introduction) between 15 to 150 nm. Typically, when the substrate 10 is made of triacetyl cellulose, it has out-of-plane retardation around −40 nm to −120 nm. This is a desired property when the compensator is designed to compensate a liquid crystal state with an ON voltage applied. The in-plane retardation discussed above is defined as the absolute value of $(n_x-n_y)*d$ and the out-of-plane retardation discussed above is defined as $[(n_x+n_y)/2)-n_z]*d$, respectively. The refractive indices $n_x$ and $n_y$ are along the slow and fast axes in plane of the substrate 10, respectively, nz is the refractive index along the substrate thickness direction (Z-axis), and d is the substrate 10 thickness. The substrate is preferably in the form of a continuous (rolled) film or web. Glass plates, ITO substrates, color filter substrates, quartz plates, silicon wafers, can also be used as substrates.

The substrate 10 can be used alone or as a pair. In the case of usage as a pair, if necessary, a spacer, a sealing agent or the like can also be used. In this invention, it is preferable that the layer adjacent to the liquid crystal layer is the layer nearest the liquid crystal layer 30 among the layers located between the substrate and the liquid crystal layer 30. It is also acceptable that the layer adjacent to the liquid crystal layer 30 functions as an orientation film or a transparent electrode.

On the substrate 10, an orientation layer 20 is applied, and a liquid crystal layer 30 is disposed on top of layer 20. The orientation layer 20 can be oriented by various techniques. In one example, the orientation layer contains a rubbing-orientable material such as a polyimide or polyvinyl alcohol and can be oriented by a rubbing technique. In another example, the orientation layer 20 contains a shear-orientable material and can be oriented by a shear-alignment technique. In another example, the orientation layer 20 contains an electrically- or magnetically-orientable material and can be oriented by an electrical- or magnetic-alignment technique. In another example, the orientation layer can also be a layer of SiOx fabricated by oblique deposition. In another example, the orientation layer 20 contains a photo-orientable material and can be oriented by a photo-alignment technique. Photo-orientable materials include, for example, photo isomerization polymers, photo-dimerization polymers, and photo-decomposition polymers. In a preferred embodiment, the photo-orientable materials are cinnamic acid derivatives as disclosed in U.S. Pat. No. 6,160,597. Such materials may be oriented and simultaneously cross-linked by selective irradiation with linear polarized UV light.

Mainly liquid crystal molecules constitute the liquid crystal layer 30. As the liquid crystal molecules, discotic liquid crystal molecules, rod-shaped (nematic) liquid crystal molecules, and cholesteric liquid crystal molecules can be used. Nematic liquid crystal molecules are especially preferred. Two or more types of liquid crystal molecules can also be used in combination. Components (such as a colorant, a dopant for tilt angle increase, dichroic colorant, polymer, polymerizing agent, sensitizing agent, phase transition temperature depressant, and stabilizer) can also be added to the liquid crystal layer in addition to the liquid crystal molecules. A variety of well established methods can be used to apply the liquid crystal layer 30 to the substrate. Accordingly, liquid crystal layer 30 can be coated on the orientation layer 20 using, the curtain coating method, extrusion coating method, roll coating method, spin coating method, dip coating method, bar coating method, spray coating method, printing coating method, and the like.

In one embodiment of the invention, the liquid crystal layer 30 is typically a nematic liquid crystalline pre-polymer when it is first disposed on the orientation layer 20, and is cross-linked by a further UV irradiation, or by other means such as heat. In a preferred embodiment, the anisotropic layer contains a material such as a diacrylate or diepoxide with positive birefringence as disclosed in U.S. Pat. No. 6,160,597 (Schadt et al.) and U.S. Pat. No. 5,602,661 (Schadt et al.). The optic axis in the anisotropic layer 30 is usually tilted relative to the layer plane, and varies across the thickness direction. The anisotropic layer 30 in accordance with the present invention is applied from a liquid medium containing a Lewis acid or a mixture of Lewis acids.

The Lewis acid increases the tilt angle of the liquid crystal molecules in layer 30 without detrimentally affecting its adhesion to orientation layer 20.

In the present invention, Lewis acids are used for the controlled increase of the tilt angle of the liquid crystal molecules. In the scope of the invention Lewis acid is defined as any species that is capable of accepting an electron-pair (IUPAC Compendium of Chemical Terminology, The Gold Book, Second Edition A. D. McNaught and A. Wilkinson Blackwell Science, 1997). In the scope of the present invention Lewis acids include chemical species that are proton sources (Brønsted and Arrhenius acids).

Suitable Lewis acid for the process according to the present invention are based on metals from Groups, IIA, IIB, IIIA, IIIB, IVB, IVA, VA, VB, VIB and VIIB of the Periodic Table of the Elements.

The Group IIB Lewis Acids have the general formula (I):

$$MX_2 \qquad (I)$$

wherein M is a Group IIB metal; X is a halogen or an organic ligand.

The Group IIIA and IIIB Lewis Acids can also be represented by the formula (II):

$$R_nMX_{(3-n)} \qquad (II)$$

wherein n is equal to 1 or 2, each R is either the same or different aryl or alkyl C1 to C15 linear or cyclic group, and each X is the same or different halogen; and wherein M is a Group IIIA or IIIB metal.

The Group IVB and IVA Lewis acids have the general formula (III)

$$MX_4 \qquad (III)$$

wherein M is a Group IVB metal and X is a ligand, preferably a halogen.

Nonlimiting examples include titanium tetrachloride, zirconium tetrachloride, or tin tetrachloride.

The Group VB and VA Lewis Acids have the general formula (IV)

$$MX_y \quad \quad (IV)$$

wherein M is a Group V metal, X is a ligand, preferably a halogen, and y is an integer from 3 to 5. Nonlimiting examples include vanadium tetrachloride and antimony pentafluoride.

In one embodiment of the present invention Lewis acids that are useful in the present invention contain an element from rows I–V of the Periodic Table. Lewis acid comprising an element from rows I–IV of the Periodic Table is preferred in the present invention. Lewis acid containg an element from rows I–III of the Periodic Table are especially preferred.

In another embodiment of the present invention, Lewis acid containing an element from group IIA–VIIb or IIB–VA of the Periodic Table are particularly useful. The Lewis acids comprising an element from group IIA–IIIB or IIIA–IVA of the Periodic Table are preferred in the present invention. Lewis acids comprising an element from group IVB or IIIAA of the Periodic Table are especially preferred in the present invention.

According to another embodiment Lewis acids that contain a compound of B, Al, Ti, Zr, Sn, Sb, Sc, La, or Zn are particularly useful in the present invention. In another aspect of the present invention, Lewis acids containing a halogen or an organic ligand are useful. Lewis acids containing a halogen are preferred. Lewis acids containing a fluoro or chloro group are particularly preferred. In another embodiment, Lewis acids containing an organic ligand selected from $CF_3SO_3^-$, $CH_3CO_2^-$, and $NO_3^-$ are particularly useful in the present invention.

Illustrative examples of Lewis acids preferred in the present invention are shown by the formulae below, but the invention is not limited to thereto.

| | |
|---|---|
| I-1 | $BF_3$ |
| I-2 | $BF_3 \cdot (C_2H_5)_2O$ |
| I-3 | $BCl_3$ |
| I-4 | $AlCl_3$ |
| I-5 | $Al(CH_3)_3$ |
| I-6 | $TiCl_4$ |
| I-7 | $ZrCl_4$ |
| I-8 | $SnCl_4$ |
| I-9 | $SnCl_4 \cdot 5H_2O$ |
| I-10 | $SnF_4$ |
| I-11 | $VCl_4$ |
| I-12 | $SbF_5$ |
| I-13 | $ScCl_3$ |
| I-14 | $ScCl_3 \cdot 6H_2O$ |
| I-15 | $Sc(CF_3SO_3)_3$ |
| I-16 | $La(CH_3CO_2) \cdot X\ H_2O$ |
| I-17 | $LaCl_3$ |
| I-18 | $LaCl_3 \cdot 7H_2O$ |
| I-19 | $LaF_3$ |
| I-20 | $La(NO_3)_3 \cdot 6H_2O$ |
| I-21 | $La(C_2O_4)_3 \cdot xH_2O$ |
| I-22 | $La(SO_4)_3 \cdot xH_2O$ |
| I-23 | $La(CF_3SO_3)_3$ |
| I-24 | $ZnCl_2$ |
| I-25 | $ZnBr_2$ |
| I-26 | $ZnF_2$ |
| I-27 | $Zn(CH_3CO_2)_2$ |
| I-28 | $Zn(CH_3CO_2)_2 \cdot 2H_2O$ |
| I-29 | $ZnSiF_6 \cdot xH_2O$ |
| I-30 | $Zn(NO_3)_2 \cdot xH_2O$ |
| I-31 | $Zn(C_2O_4)_2 \cdot xH_2O$ |
| I-32 | $Nd(CF_3SO_3)_3$ |

Chemical species that are useful in present invention as proton sources are Lewis acids and also Bronsted or Arrhenius acids have general formula (V)

$$A^-H^+ \quad \quad (V)$$

wherein $A^-$ is a counterion and $H^+$ is a proton.

In one embodiment of the present invention, protic acids that are useful in present invention have pKa<10. Protic acids that are preferred in the present invention have pKa values<0. Protic acids acids with pKa<–8 are the most preferred in the present invention.

Illustrative examples of some protic acids preferred in the present invention are shown by the formulae and pKa values below, but the invention is not limited to thereto.

| | Protic Acid | pKa |
|---|---|---|
| I-33 | $CF_3SO_3H$ | –12 |
| I-34 | $C_6H_5SO_3H$ | –2.5 |
| I-35 | $CH_3SO_3H$ | –2.0 |
| I-36 | $CF_3CO_2H$ | 0.2 |
| I-37 | $CCl_3CO_2H$ | 0.77 |
| I-38 | $CHCl_2CO_2H$ | 1.25 |
| I-39 | $CFH_2CO_2H$ | 2.6 |
| I-40 | $CClCH_2CO_2H$ | 2.85 |
| I-41 | $HCO_2H$ | 3.75 |
| I-42 | $C_6H_5CO_2H$ | 4.2 |
| I-43 | $CH_3CO_2H$ | 4.75 |

In general Lewis acids are soluble in the coating solvent and addition of these salts to liquid crystal layer 30 does not change the refractive index of the liquid crystal layer 30 by more than about ±10 percent. More preferably such Lewis acids will not change the refractive index the liquid crystal layer 30 by more than about ±5 percent. Most preferably such refractive index will not change the refractive index of the liquid crystal layer 30 by more than about ±2 percent. In addition, such Lewis acids will increase the average tilt of liquid crystal layer 30 by more than about 95%. More preferably such Lewis acids will increase the average tilt of liquid crystal layer 30 by more than about 50%. Most preferably such Lewis acid will increase the average tilt of the liquid crystal layer 30 by more than about 35% compared to the angle obtained without their presence.

The Lewis acid can be added into a coating solution of liquid crystal layer 30. The Lewis acid is added in an amount appropriate to attain the desired tilt angle increase of liquid crystal molecules without disturbing the orientation of the liquid crystal layer 30. The Lewis acid is generally added in an amount of 0.1 to 10 wt % conveniently 0.25 to 5.0 wt % and usually in the range of 0.25 to 1.5 wt % of the anisotropic layer 30. The amount of the Lewis acid added is dependent on both the composition of the liquid crystal layer 30 and the tilt increase desired since both of these can have an impact.

The anisotropic layer may also contain addenda such as surfactants, light stabilizers and UV initiators. UV initiatiors include materials such as benzophenone and acetophenone and their derivatives; benzoin, benzoin ethers, benzil, benzil ketals, fluorenone, xanthanone, alpha and beta naphthyl carbonyl compounds and ketones. Preferred initiators are alpha-hydroxyketones.

The present invention is illustrated in more detail by the following non-limiting examples.

In examples described below in-plane retardation was measured to assess the quality of liquid crystal alignment. For samples with tilt angles near zero, the measured (effective) birefringence of the LC layer should be between 0.12–0.13. However, as tilt angle increases, the effective birefringence decreases. For a series of examples of approximately the same layer thickness, this should result in decreasing in plane retardation with increasing tilt angle. This is exactly what is seen for these examples, confirming good alignment for all examples.

EXAMPLE 1

Comparison

This example demonstrates the photo-alignment of liquid crystal molecules on a photo-aligned layer on a glass substrate.

On a clean glass plate, a coating solution containing a mixture of VANTICO Staralign® 2110 and Staralign® 2100 photo-aligning vinyl cinnamate polymers (in 30:70 wt % ratio; 1 wt % total solids in methyl ethyl ketone) was spun cast (@700–1000 rpm). The sample was dried at 55° C. for 5 min. and then exposed to 308 nm polarized light (15–30 mJ/cm$^2$) at an inclination of 20 degrees away from normal angle of incidence to obtain a photo-aligned orientation layer. Typically this produced a 30–100 nm thick layer as measured by ellipsometry.

On the orientation layer a solution of liquid crystal prepolymer (LCP, CB483MEK from Vantico Co, 7 wt % in methyl ethyl ketone, supplied with photoinitiator) in methyl ethyl ketone was spun cast @ 700–1000 rpm. The sample was then heated at a temperature of 55° C. for 3 minutes to orient the nematic liquid crystalline layer and remove solvent. The sample was cooled to room temperature and the anisotropic layer was fixed by exposing to 365 nm light (300–1000 mJ/cm$^2$) under an atmosphere of nitrogen. In-plane retardation measurement indicated that liquid crystal molecules were aligned parallel to the direction of polarized irradiation. In-plane retardation, average tilt angle, and thickness of the anisotropic layer were measured by ellipsometry (J. A. Woollam Co., Model M2000V). The measured average tilt angle method had accuracy of ±2.0 degrees.

EXAMPLE 2

Inventive

This example shows that addition of Borontrifluoride etherate BF3-Et2O (I-2) salt to a liquid crystal layer comprising liquid crystal molecules increases the average tilt angle.

A photo-aligned orientation layer was prepared as in Example 1. BF3-Et2O (I-2) (0.25–1.5 wt % of dried liquid crystal layer) was added to LCP mixture CB483MEK from Vantico Co and spun cast on the orientation layer (@700–1000 rpm). The sample was then heated at a temperature of 55° C. for 3 minutes to orient the nematic liquid crystalline layer and remove solvent. The sample was cooled to room temperature and liquid crystal layer cross-linked by exposing to 365 nm light (300–1000 mJ/cm$^2$) under an atmosphere of nitrogen.

TABLE I

|  | Wt % of added I-2 | Layer Thickness, (nm) | In Plane Retardation nm(measured @ 550 nm) | Average Tilt Angle (±2°) |
| --- | --- | --- | --- | --- |
| Comparison Example. 1 | 0 wt % | 524 | 47 | 25 |

TABLE I-continued

|  | Wt % of added I-2 | Layer Thickness, (nm) | In Plane Retardation nm(measured @ 550 nm) | Average Tilt Angle (±2°) |
| --- | --- | --- | --- | --- |
| Inventive Example. 2 | 0.25 wt % | 486 | 36 | 38 |
|  | 0.50 wt % | 480 | 24 | 48 |
|  | 0.75 wt % | 488 | 25 | 51 |
|  | 1.0 wt % | 476 | 22 | 54 |

The aforementioned examples in Table I clearly demonstrate that compared to comparison Example 1 incremental addition of borontrifluoride etherate (I-2) to the liquid crystal layer results in controlled increase in the average tilt angle of liquid crystal molecules.

EXAMPLE 3

Inventive

This example shows that addition of Zinc Chloride (I-24) salt to liquid crystal layer comprising two liquid crystal molecules increases the average tilt angle.

A photo-aligned orientation layer was prepared as in Example 1. Zinc Chloride (I-24) (0.25–1.0 wt % of dried liquid crystal layer) was added to LCP mixture CB483MEK from Vantico Co and spun cast on the orientation layer (@700–1000 rpm). The sample was then heated at a temperature of 55° C. for 3 minutes to orient the nematic liquid crystalline layer and remove solvent. The sample was cooled to room temperature and liquid crystal layer was cross-linked by exposing to 365 nm light (300–1000 mJ/cm$^2$) under an atmosphere of nitrogen.

TABLE II

|  | Wt % of added I-24 | Layer Thickness, (nm) | In Plane Retardation nm(measured @ 550 nm) | Average Tilt Angle (±2°) |
| --- | --- | --- | --- | --- |
| Comparison Example. 1 | 0 wt % | 510 | 42 | 26 |
| Inventive Example. 3 | 0.25 wt % | 510 | 42 | 31 |
|  | 0.50 wt % | 518 | 40 | 33 |
|  | 0.75 wt % | 505 | 40 | 35 |
|  | 1.0 wt % | 550 | 44 | 35 |

The aforementioned examples in Table II clearly demonstrate that compared to comparison Example 1 incremental addition of zinc chloride (I-24) to the liquid crystal layer results in controlled increase in the average tilt angle of liquid crystal molecules.

EXAMPLE 4

Inventive

This example shows that addition of stannic terachloride (I-8) salt to liquid crystal layer comprising of two liquid crystal molecule increases the average tilt angle.

A photo-aligned orientation layer was prepared as in Example 1. Stannic tetrachloride (I-8) (0.25–1.0 wt % of dried liquid crystal layer) was added to the LCP mixture CB483MEK from Vantico Co and spun cast on the orientation layer (@700–1000 rpm). The sample was then heated at a temperature of 55° C. for 3 minutes to orient the nematic liquid crystalline layer and remove solvent. The sample was cooled to room temperature and liquid crystal layer was cross-linked by exposing to 365 nm light (300–1000 mJ/cm$^2$) under an atmosphere of nitrogen.

TABLE III

| | Wt % of Added I-8 | Layer Thickness, (nm) | In Plane Retardation nm(measured @ 550 nm) | Average Tilt Angle (±2°) |
|---|---|---|---|---|
| Comparison Example. 1 | 0 wt % | 505 | 46 | 26 |
| Inventive Example. 4 | 0.12 wt % | 500 | 39 | 32 |
| | 0.50 wt % | 500 | 39 | 34 |
| | 0.75 wt % | 515 | 42 | 36 |
| | 1.00 wt % | 495 | 35 | 37 |

The aforementioned examples in Table III clearly demonstrate that compared to comparison Example 1 incremental addition of stannic chloride (I-8) to liquid crystal results in controlled increase in the average tilt angle of liquid crystal molecules.

EXAMPLE 5

Inventive

This example shows that addition of Neodymium trifluoromethylsulfonate (I-32) salt to liquid crystal layer comprising two liquid crystal molecules increases the average tilt angle.

A photo-aligned orientation layer was prepared as in Example 1. Neodymium trifluoromethylsulfonate (I-32) (0.25–1.0 wt % of dried liquid crystal layer) was added to LCP mixture CB483MEK from Vantico Co and spun cast on the orientation layer (@700–1000 rpm). The sample was then heated at a temperature of 55° C. for 3 minutes to orient the nematic liquid crystalline layer and remove solvent. The sample was cooled to room temperature and liquid crystal layer was cross-linked by exposing to 365 nm light (300–1000 mJ/cm$^2$) under an atmosphere of nitrogen.

TABLE IV

| | Wt % of added I-32 | Layer Thickness, (nm) | In Plane Retardation nm(measured @ 550 nm) | Average Tilt Angle (±2°) |
|---|---|---|---|---|
| Comparison Example. 1 | 0 wt % | 510 | 42 | 26 |
| Inventive Example. 5 | 0.25 wt % | 529 | 50 | 28 |
| | 0.50 wt % | 507 | 44 | 29 |
| | 0.75 wt % | 490 | 39 | 30 |
| | 1.0 wt % | 510 | 46 | 31 |

The aforementioned examples in Table IV clearly demonstrate that compared to comparison Example 1 incremental addition of neodymium trifluoromethane sulfonate (I-32) to the liquid crystal layer results in controlled increase in the average tilt angle of liquid crystal molecules.

EXAMPLE 6

Comparison

This example demonstrates the photo-alignment of liquid crystal molecules on a photo-aligned layer on a glass substrate.

On a clean glass plate, a coating solution containing a mixture of VANTICO Staralign® 2110 and Staralign® 2100 photo-aligning vinyl cinnamate polymers (in 30:70 wt % ratio; 1 wt % total solids in methyl ethyl ketone) was spun cast (@700–1000 rpm). The sample was dried at 55° C. for 5 min. and then exposed to 308 nm polarized light (15–30 mJ/cm$^2$) at an inclination of 20 degrees away from normal angle of incidence to obtain a photo-aligned orientation layer. Typically this produced a 30–100 nm thick layer as measured by ellipsometry.

On the orientation layer a solution of liquid crystal prepolymer (LCP, CB483MEK from Vantico Co, 7 wt % in methyl ethyl ketone, supplied with photoinitiator) in methyl ethyl ketone was spun cast @700–1000 rpm. The sample was then heated at a temperature of 55° C. for 3 minutes to orient the nematic liquid crystalline layer and remove solvent. The sample was cooled to room temperature and the anisotropic layer was fixed by exposing to 365 nm light (300–1000 mJ/cm$^2$) under an atmosphere of nitrogen. In-plane retardation measurement indicated that liquid crystal molecules were aligned parallel to the direction of polarized irradiation. In-plane retardation, average tilt angle, and thickness of the anisotropic layer were measured by ellipsometry (J. A. Woollam Co., Model M2000V). The measured average tilt angle method had accuracy of ±2.0 degrees.

EXAMPLE 7

Inventive

This example shows that addition of a protic acid methanesulfonic acid (I-35) to liquid crystal layer comprising two liquid crystal molecules increases the average tilt angle.

A photo-aligned orientation layer was prepared as in Example 1. Methane sulfonic acid (I-35) (0.25–1.0 wt % of dried liquid crystal layer) was added to LCP mixture CB483MEK from Vantico Co and spun cast on the orientation layer (@700–1000 rpm). The sample was then heated at a temperature of 55° C. for 3 minutes to orient the nematic liquid crystalline layer and remove solvent. The sample was cooled to room temperature and liquid crystal layer was cross-linked by exposing to 365 nm light (300–1000 mJ/cm$^2$) under an atmosphere of nitrogen.

TABLE IV

| | Wt % of added I-35 | Layer Thickness, (nm) | In Plane Retardation nm(measured @ 550 nm) | Average Tilt Angle (± 2°) |
|---|---|---|---|---|
| Comparison Example. 6 | 0 wt % | 610 | 64 | 11 |
| Inventive Example. 7 | 0.25 wt % | 549 | 48 | 25 |

The aforementioned examples in Table IV clearly demonstrate that compared to comparison Example 6 addition of methanesulfonic acid (I-35) to the liquid crystal layer results in controlled increase in the average tilt angle of liquid crystal molecules.

EXAMPLE 8

Comparison

This example demonstrates the photo-alignment of a single liquid crystal molecule on a glass substrate.

Liquid crystals were prepared following the general procedure described in WO2000048985(A1). A solution of liquid crystal was made following the general procedure disclosed in WO2000048985(A1). Thus, a 7% by weight mixture of liquid crystals was made by mixing LC-1 in methyl ethyl ketone. IRGACURE 369 (2-Benzyl 2-dimethylamino 1-(4-morpholinophenyl) butanone-1) from Ciba-Giegy (1% by weight of LC), TINUVIN-123 (bis(1-octyloxy-2,2,6,-tetramethyl-4-piperidyl)sebacate) (1% by weight of LC), and 2,6-di-tert-butyl-p-cresol (2% by weight of LCs) were added to the LC solution.

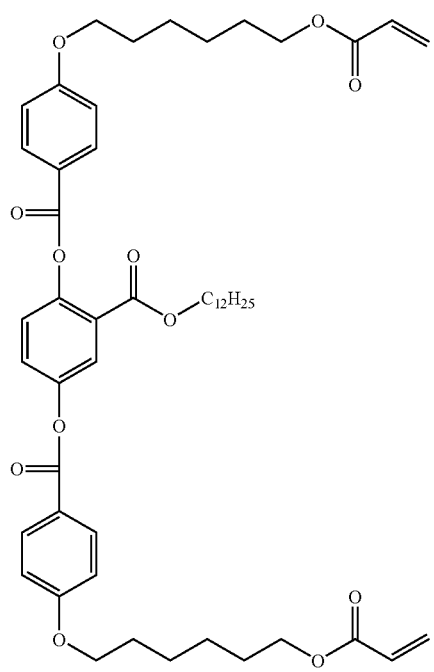

LC-1

On a clean glass plate, a coating solution containing a mixture of VANTICO Staralign® 2110 and Staralign® 2100 photo-aligning vinyl cinnamate polymers (in 30:70 wt % ratio; 1 wt % total solids in methyl ethyl ketone) was spun cast (@700–1000 rpm). The sample was dried at 55° C. for 5 min. and then exposed to 308 nm polarized light (15–30 mJ/cm$^2$) at an inclination of 20 degrees away from normal angle of incidence to obtain a photo-aligned orientation layer.

On the orientation layer a solution of LC-1 prepared above in methyl ethyl ketone was spun cast @700–1000 rpm. The sample was then heated at a temperature of 55° C. for 3 minutes to orient the nematic liquid crystalline layer and remove solvent. The sample was cooled to room temperature and the anisotropic layer was fixed by exposing to 365 nm light (300–1000 mJ/cm$^2$) under an atmosphere of nitrogen. In-plane retardation measurement indicated that liquid crystal molecules were aligned parallel to the direction of polarized irradiation. In-plane retardation, average tilt angle, and thickness of the anisotropic layer were measured by ellipsometry (J. A. Woollam Co., Model M2000V). The measured average tilt angle method had accuracy of ±2.0 degrees.

EXAMPLE 9

Inventive

This example shows addition of stannic tetrachloride salt (I–8) salt to liquid crystal layer comprising one liquid crystal molecule increases the average tilt angle.

A photo-aligned orientation layer was prepared as in Example 6. Stannic tetrachloride (I-8) (0.25–1.5 wt % of dried liquid crystal layer) was added to the methyl ethyl ketone solution of crosslinkable diacrylate nematic liquid crystal solution (prepared above) and spun cast on the orientation layer (@700–1000 rpm). The sample was then heated at a temperature of 55° C. for 3 minutes to orient the nematic liquid crystalline layer and remove solvent. The sample was cooled to room temperature and liquid crystal layer was cross-linked by exposing to 365 nm light (300–1000 mJ/cm$^2$) under an atmosphere of nitrogen.

TABLE V

| | Wt % of added I-8 | Layer Thickness, (nm) | In Plane Retardation nm(measured @ 550 nm) | Average Tilt Angle (±2°) |
|---|---|---|---|---|
| Comparison Example. 8 | | 4609 | 55 | 7 |
| Inventive Example. 9 | 0.25 wt % | 444 | 49 | 10 |
| | 0.50 wt % | 478 | 50 | 13 |

The aforementioned examples in Table V clearly demonstrate that compared to comparison Example 8 incremental addition of SnCl$_4$ (I-8) to liquid crystal layer results in controlled increase in the average tilt angle of a single liquid crystal molecule LC-1.

The patents and other publications referred to herein are incorporated herein in their entirety.

PARTS LIST

5 Multilayer film
10 Substrate
20 Orientation Layer
30 Liquid crystal layer

What is claimed is:

1. A liquid crystal display containing a multilayer film comprising a substrate bearing an aligned fixed liquid crystal layer wherein the liquid crystal layer contains a Lewis acid.

2. The display of claim 1 wherein the Lewis acid is an aprotic acid.

3. The display of claim 2 wherein the Lewis acid contains an element from rows 1–5 of the Periodic Table.

4. The display of claim 2 wherein the Lewis acid contains an element from rows 1–4 of the Periodic Table.

5. The display of claim 2 wherein the Lewis acid contains an element from rows 1–3 of the Periodic Table.

6. The display of claim 2 wherein the Lewis acid contains an element from group 2a–7b or 2b–5a of the Periodic Table.

7. The display of claim 2 wherein the Lewis acid contains an element from group 2a–3b or 3a–4a of the Periodic Table.

8. The display of claim 2 wherein the Lewis acid contains an element from group 4b or 3a of the Periodic Table.

9. The display of claim 2 wherein the Lewis acid contains a compound of B, Al, Ti, Zr, Sn, Sb, Sc, La, or Zn.

10. The display of claim 2 wherein the Lewis acid contains a halogen or an organic ligand.

11. The display of claim 10 wherein the Lewis acid contains a halogen.

12. The display of claim 10 wherein the Lewis acid contains a fluoro or chloro group.

13. The display of claim 10 wherein the Lewis acid contains an organic ligand.

14. The display of claim 10 wherein the Lewis acid contains an organic ligand selected from $CF_3SO_3^-$, $CH_3CO_2^-$, and $NO_3^-$.

15. The display of claim 1 wherein the Lewis acid is a protic acid.

16. The display of claim 15 wherein the pKa of the protic acid is less than 10.

17. The display of claim 15 wherein the pKa of the protic acid is less than 0.

18. The display of claim 15 wherein the pKa of the protic acid is less than −5.

19. The display of claim 15 wherein the protic acid is selected from the group consisting of methanesulfonic acid, trifluoroacetic acid, acetic acid, and trifluoromathansulfonic acid.

20. The display of claim 1 wherein the liquid crystal is nematic or discotic.

21. The display of claim 1 wherein the liquid crystal contains an ester, alkoxy or cyano group.

22. The display of claim 1 wherein the liquid crystal contains a cyano group.

23. The display of claim 1 wherein the Lewis acid is represented by formula (II)

$$R_nMX_{(3-n)} \qquad (II)$$

wherein:
M is an element from Group IIIa or IIIb of the Periodic Table;
n is equal to 1 or 2;
R is either the same or different C1 to C15 linear or cyclic group; and
each X is the same or different halogen.

24. The display of claim 1 wherein the Lewis acid is represented by formula (I)

$$MX_2 \qquad (I)$$

wherein M is a Group IIB metal; and X is a halogen or organic ligand.

25. The display of claim 1 wherein the Lewis acid is a salt or compound from Group IV of the Periodic Table of Elements represented by the general formula (III)

$$MX_4 \qquad (III)$$

wherein M is a Group IVA or IVB metal and X is a ligand.

26. The display of claim 1 wherein the Lewis acid is a salt or compound from Group VB and VA of the Periodic Table of Elements represented by the general formula (IV)

$$MX_y \qquad (IV)$$

wherein M is a Group V metal, X is a ligand, and y is an integer from 3 to 5.

27. A process for imparting an increased tilt angle to a liquid crystal layer upon curing comprising including in that layer a Lewis acid according to claim 1.

28. The process of claim 27 wherein the Lewis acid is present in an amount of at least 0.25 wt %.

* * * * *